US006189425B1

(12) United States Patent
Ricci et al.

(10) Patent No.: US 6,189,425 B1
(45) Date of Patent: Feb. 20, 2001

(54) RAPID END PREP LATHE

(75) Inventors: Donato L. Ricci, W8477 - 162nd Ave., Hager City, WI (US) 54014; Brent Place, Red Wing, MN (US)

(73) Assignee: Donato L. Ricci, Hager City, WI (US)

( * ) Notice: Under 35 U.S.C. 154(b), the term of this patent shall be extended for 0 days.

(21) Appl. No.: 09/416,751

(22) Filed: Oct. 13, 1999

(51) Int. Cl.$^7$ .................................................. B23B 5/16
(52) U.S. Cl. ............................... 82/113; 82/128; 82/131; 82/136
(58) Field of Search .................. 82/113, 70.1, 70.2, 82/59, 131, 136, 128

(56) References Cited

U.S. PATENT DOCUMENTS

| | | | |
|---|---|---|---|
| 4,411,178 | * 10/1983 | Wachs et al. | 82/113 |
| 4,493,232 | * 1/1985 | Nall | 82/113 |
| 4,677,884 | * 7/1987 | Kwech et al. | 82/113 |
| 4,799,409 | 1/1989 | Ricci . | |
| 5,189,933 | * 3/1993 | Ricci | 82/113 |
| 5,549,024 | * 8/1996 | Ricci | 82/113 |
| 5,887,501 | 3/1999 | Ricci . | |

* cited by examiner

Primary Examiner—Henry Tsai
(74) Attorney, Agent, or Firm—Nikolai, Mersereau & Dietz, P.A.

(57) ABSTRACT

A rapid set-up end prep lathe for machining piping and piping components in the field comprises a mandrel mountable to the internal diameter of a tubular workpiece and with the ability to rapidly establish a concentric orientation of the mandrel with the workpiece. Mounted on the mandrel is an annular housing that is longitudinally displaceable along the mandrel. It supports a gear ring carrying either one or two tool feed assemblies thereon for orbital and radial movement of a cutting tool relative to the workpiece. The tool slide assemblies are adjustably mounted permitting the tool to travel at an angle between 0° and about 37° with respect to the surface of the gear ring. Ramps of adjustable slope affixed to the annular housing are coupled through a one-way ratchet clutch to permit variation of the feed rate of the tool slide.

22 Claims, 7 Drawing Sheets

RAPID END PREP LATHE

BACKGROUND OF THE INVENTION

I. Field of the Invention

This invention relates generally to apparatus for refurbishing pipes, valves, flanges and the like in industrial plants, such as power generation facilities, petroleum pipeline facilities and the like, and more particularly to a portable lathe machine that can be rapidly set up and used in the field to accurately machine flat or beveled surfaces on pipe flanges, valve, fittings and pipe ends within close tolerance ranges.

II. Discussion of the Prior Art

Various portable machines for performing different machining operations are known in the art. In the refurbishment of industrial tubing, such as is found in refineries, pipelines, steam power plants and the like, it is often necessary to cut through a pipe and then perform one or more end prep operations, such as beveling, facing, threading, etc. to thereby facilitate the joining of pipe ends or flanges. The Wachs et al. U.S. Pat. No. 4,411,178 describes a typical prior art machine for end prepping pipes and piping components. In that machine, separate drive motors are required for causing radial and axial feed of the tool. The feed rates are controlled by controlling the speed of the two motors. Moreover, the design reflected in the Wachs et al. '178 patent precludes the tool slide and tool supported thereby to be placed at an angle to the base plate 30, thus making it more difficult to accurately bevel the end of a pipe workpiece.

The present invention also comprises an improvement over my earlier portable end prep machine described in U.S. Pat. No. 4,799,409. For example, in that earlier design, no provision is made for an adjustable radial feed rate of the cutting tool, nor is any provision made for tilting the tool slide at a desired angle to the axis of the pipe to facilitate mitering or beveling of the pipe end being machined. Further, no provision is made for accurately gauging movement in the axial feed direction as an operator manually attempts to adjust axial displacement of the housing on which the tool head is mounted.

SUMMARY OF THE INVENTION

The present invention comprises a portable rapid end prep lathe for machining piping components. It comprises an elongated mandrel having radially adjustable legs proximate one end thereof which are adapted to cooperate with the internal diameter of a pipe or pipe component to be worked on so as to concentrically mount the mandrel relative to the axis of that workpiece. An annular housing is concentrically mounted on the portion of the mandrel that projects outward from the end of the tubular workpiece. The annular housing member is longitudinally displaceable along the mandrel. Contained within it is a plurality of regularly spaced bearings that project outwardly from one face of the housing member proximate an outer periphery thereof. A gear ring is also concentrically disposed on and journaled for rotation about the mandrel. The gear ring has first and second faces where the first face includes an annular groove into which fits the plurality of regularly spaced bearings. At least one, and preferably two, slide assemblies are mounted on a second face of the gear ring. The slide assemblies include a base member with a threaded feed screw journaled for rotation therein, the feed screw carrying a threaded feed nut. A tool block is slidably mounted on the base and engaged by the feed nut such that rotation of the feed screw affects displacement of the tool block relative to the base. A motor is affixed to the annular housing and arranged to drive the gear ring. A drive mechanism is operatively coupled between the gear ring and the feed screw for rotating the feed screw to thereby radially reposition the tool block that carries the cutting bit therein.

In accordance with a further feature of the invention, the drive means includes a gear box assembly having a forward, reverse and neutral position as well as a novel mechanism for varying the speed of rotation of the feed screw in the tool slide assembly. This mechanism includes a plurality of ramps pivotally joined to a face of the annular housing member. A mechanism is provided for manually setting the slope angle of these ramps. The input shaft to the gear box has a one-way ratchet clutch affixed to it and a cam is provided that is adapted to traverse the plurality of ramps as the gear ring is driven where the cam rotates the one-way ratchet clutch by an amount determined by the slope angle of the ramps. A manual adjustment is provided for setting the slope angle of the ramps and, therefore, the speed at which the input shaft to the gear box operates.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
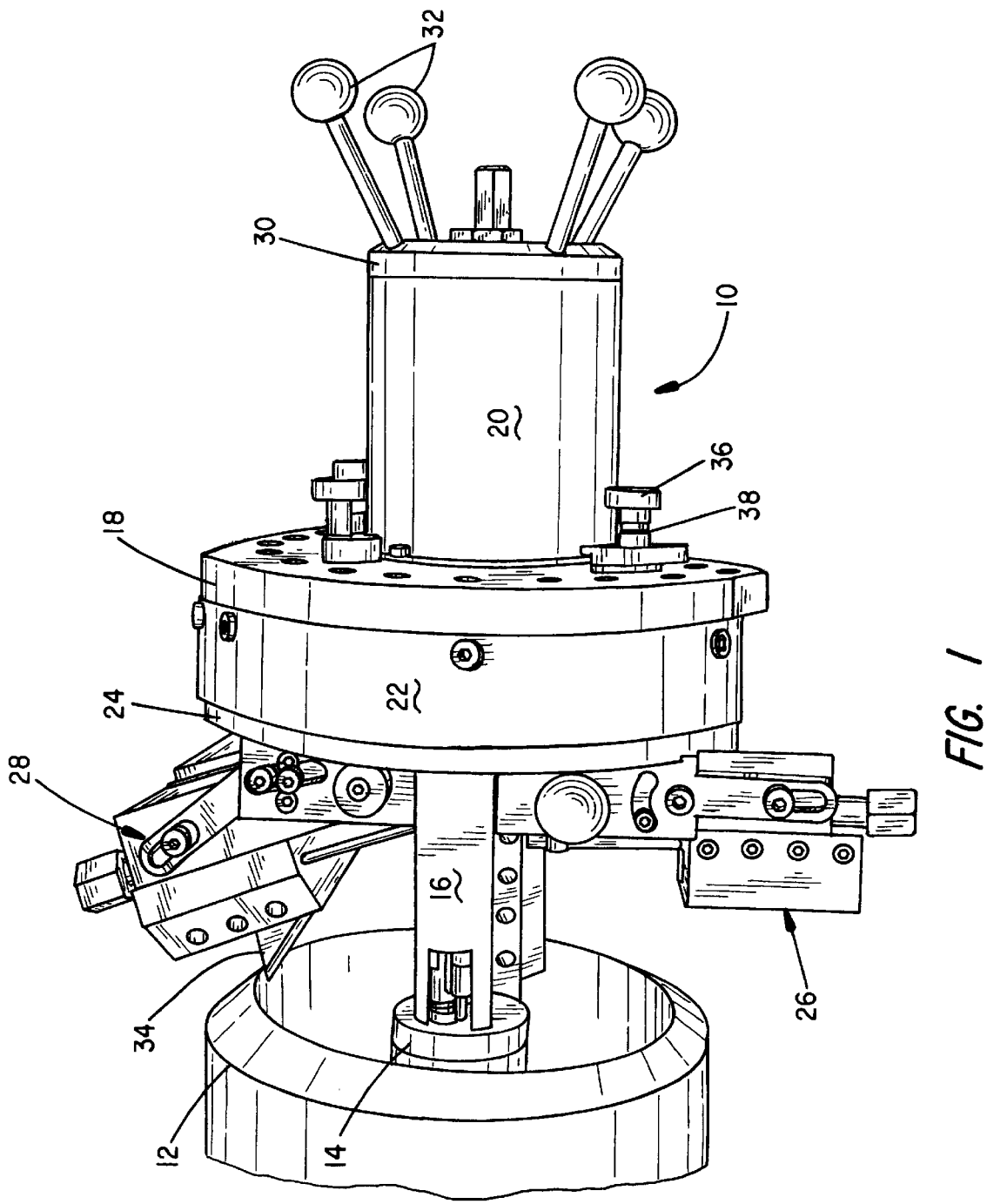
FIG. 1 is a perspective view of the rapid end prep machine constructed in accordance with the present invention.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

FIG. 1 is a perspective view of the portable rapid end prep machine comprising a preferred embodiment of the present invention. It is indicated generally by numeral 10 and is shown as being mounted to the inside diameter of a pipe 12 that constitutes the workpiece. Only partially visible in FIG. 1 within the central opening of the pipe 12 is a mandrel clamping assembly that includes a base member 14 having a plurality of radially extending legs that can be made to press against the inside wall of the pipe 12. Concentrically disposed relative to the base 14 and the pipe 12 is a generally cylindrical mandrel member 16 which supports an annular housing 18 and a housing hub 20 thereon.

As will be explained in considerably greater detail hereinbelow, the housing 18 and the housing hub 20 are designed to be axially translatable along the mandrel but they are precluded from rotation. Hidden from view in FIG. 1 by an annular shield 22 are a plurality of regularly, circumferentially-spaced, adjustable bearings that cooperate with an annular groove formed on the inner face of a gear ring member 24. Mounted on the outer face of the gear ring 24 are tool slide assemblies indicated generally by numerals 26 and 28. The tool slide assemblies 26 and 28 will be more particularly described with reference to FIG. 7, but for now it is suffice to say that the tool slide assembly 26 is mounted perpendicular to the longitudinal axis of the mandrel 16 whereas the tool slide assembly 28 is shown as being adjustably set at a predetermined angle to the longitudinal axis of the mandrel.

Figure 5:
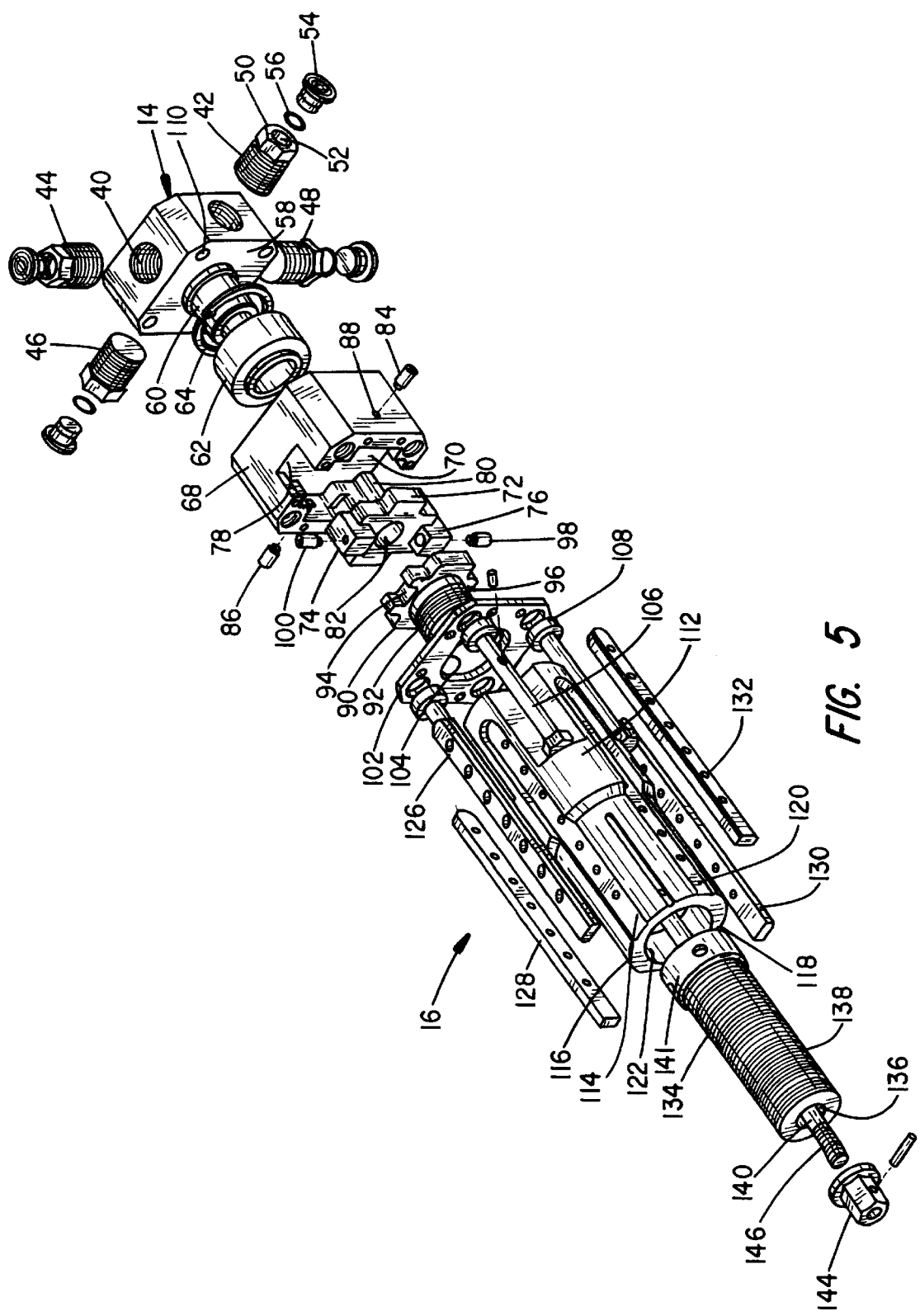
FIG. 5 is an exploded view of the mandrel subassembly used in the machine of FIG. 1.

Also, as will be further explained with the aid of FIG. 5, the mandrel assembly incorporates a feed screw coaxially disposed therewith and which is contained within the housing hub 20. Mounted on the feed screw is a feed nut that is affixed to a hand wheel 30. When the hand wheel is rotated with the aid of the handle members 32, the housing hub 20 and the annular housing 22 are controllably displaced in the axial direction along the mandrel. A hydraulic motor or air motor (not shown) mounts to the housing member 18 and has a pinion gear on its output shaft for engaging teeth on the periphery of the ring gear 24. As such, the tool slide assemblies 26 and 28 rotate with the ring gear, allowing a blade member 34 carried by tool slide assembly 28 to engage the workpiece 12 and perform a desired machining operation thereon.

Also visible in the assembled view of FIG. 1 are adjustment knobs, as at 36, that are mounted on threaded shafts 38 that penetrate through the outer face of the annular housing and are used to set the feed rate for the slide assemblies 26 and 28, all as will be further explained hereinbelow.

Having described the general organization of the rapid end prep machine comprising the preferred embodiment of the present invention with the aid of FIG. 1, consideration will next be given to the details of its internal construction. In this regard, reference will be made to the cross-sectional view of FIG. 3 and the exploded view of FIG. 5 in first explaining the construction features of the mandrel assembly 16 employed.

The mandrel comprises the mount base 14 which constitutes a generally rectangular block having beveled corners. Formed inwardly of its four edge faces are a plurality of threaded bores, as at 40, for receiving externally threaded tubular locators 42, 44, 46, and 48 therein. The locators include a hex surface, as at 50 on locator 42, to facilitate adjustment of the extent of projection of the locators with respect to the mount base 14. Fitted into the longitudinal bores 52 of each of the locators 42–48 are locator foot members, as at 54. The foot members 54 are frictionally held therein by means of O-rings as at 56. As such, the locators 42–48 can be rotated with a wrench while the foot members 54 remain stationary against the internal diameter of a pipe or piping component to be machined.

Projecting outwardly from face 58 of the mount base 14 is a cylindrical stub shaft 60 which is fitted with a spherical bearing 62 and held in place by a snap ring 64. The spherical bearing fits within a counterbore 66 (FIG. 3) of a mandrel housing member 68. The mandrel housing member 68 includes a cavity 70 formed in a front face thereof for receiving a mounting plate 72 therein, the mounting plate being generally cruciform in shape and having upper and lower orthogonally projecting lugs 74 and 76 that are adapted to fit within corresponding notches 78 and 80 formed in the mandrel housing member 68. The mounting plate 72 further includes a central bore 82 formed therethrough. When the mounting plate 72 is resident in the cavity 70 of the mandrel housing member 68, threaded set screws 84 and 86, which are arranged to pass through internally threaded bores, as at 88, provide lateral positioning of the mounting plate 72 within the housing.

A further mounting plate 90 is included in the assembly and it includes a tubular stub 92 that projects orthogonally from a front major surface thereof and it is externally threaded. The plate 90 further includes complimentary upper and lower notches 94 and 96 for receiving the outwardly projecting portions of the lugs 74 and 76 therein when the plate 90 is juxtaposed with the plate 72. When so juxtaposed, set screws as at 98 and 100 which pass through aligned threaded bores in the lugs 74 and 76 cooperate with the mounting plate 90 to allow vertical adjustment thereof.

A cover plate 102 has a central bore 104 formed therethrough to allow the externally threaded tubular portion 92 of the mounting plate 90 to pass therethrough. Four elongated bolts as at 106 pass through spherical washers 108 and through aligned bores formed in the four corners of the plate 102 and through correspondingly aligned bores in the mandrel. housing member 68 to mate with threaded apertures, as at 110, formed in the four corners of the mount base member 14.

With the mandrel mounting assembly thus far described fully assembled, a mandrel shaft member 112 is screwed onto the threaded stub 92. More particularly, the mandrel shaft 112 is generally circular in cross section, but with longitudinal key ways 114, 116, 118 and 120 formed at regularly spaced intervals in an outer surface thereof. It has a central bore 122 (FIG. 3) of a predetermined diameter formed therethrough. Counterbores 123 and 124 are formed at opposite ends of central bore 122. The counterbore 124 is internally threaded to mate with the external threads on stub 92 of the mounting plate 90. Elongated keys 126, 128, 130 and 132 fit into the respective key ways 114, 116, 118 and 120 and are held in place by suitable bolts (not shown). Fitted into the counterbore 123 is a mandrel feed screw member 134. As seen in FIG. 5, it comprises an elongated cylindrical, tubular body having a central longitudinal bore 136 formed through it and is provided with external threads 138 over an extended portion of its length. A cylindrical surface 141 fits over a rear end thereof where the outside diameter of the surface is slightly less than the inside diameter of the counterbore 123 formed in the mandrel shaft 112.

Figure 3:
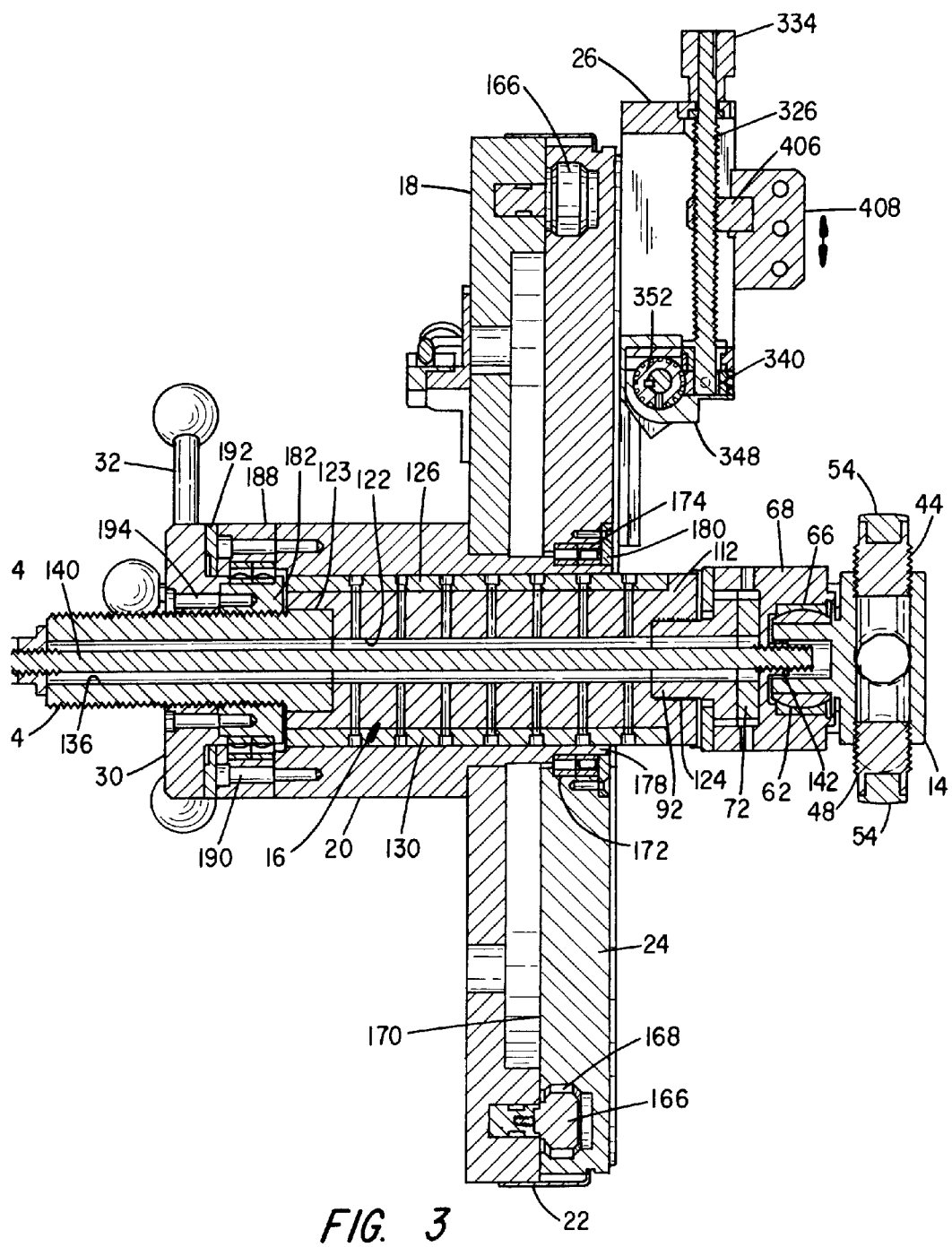
FIG. 3 is a longitudinal cross-sectional view of the device of FIG. 1.

The mandrel shaft 112 and the mandrel feed screw member 134 become affixed to the mount assembly including the cover plate 102 and all parts to the right thereof shown in FIG. 5, by means of a draw rod 140 which, as seen in FIG. 3, passes through the internal bores 136, 122 and 82 into a threaded hub 142 formed internally of the mandrel mount housing 68. When a hex draw rod nut 144 is assembled onto a threaded end portion 146 of the draw rod 140 and snugged up against the end face of the mandrel feed screw 134, the components comprising the mandrel assembly become locked together.

The four set screws are used to adjust the position of the mounting plate 90. Set screws 84 and 86 adjust mounting plate 72 in the horizontal plane. Set screws 98 and 100 adjust mounting plate 90 in the vertical direction, thus centering the machine to the workpiece. The spherical washers 108 allows the mandrel 112 to pivot about its axis, thus squaring the machine to the work surface. Pivoting is controlled by the adjustment of the four hex bolts 106 which pivot on spherical washers 108. Bearing 62 holds mounting block 14 in place, but permits pivoting thereof relative to mandrel mount housing 68.

Figure 2:
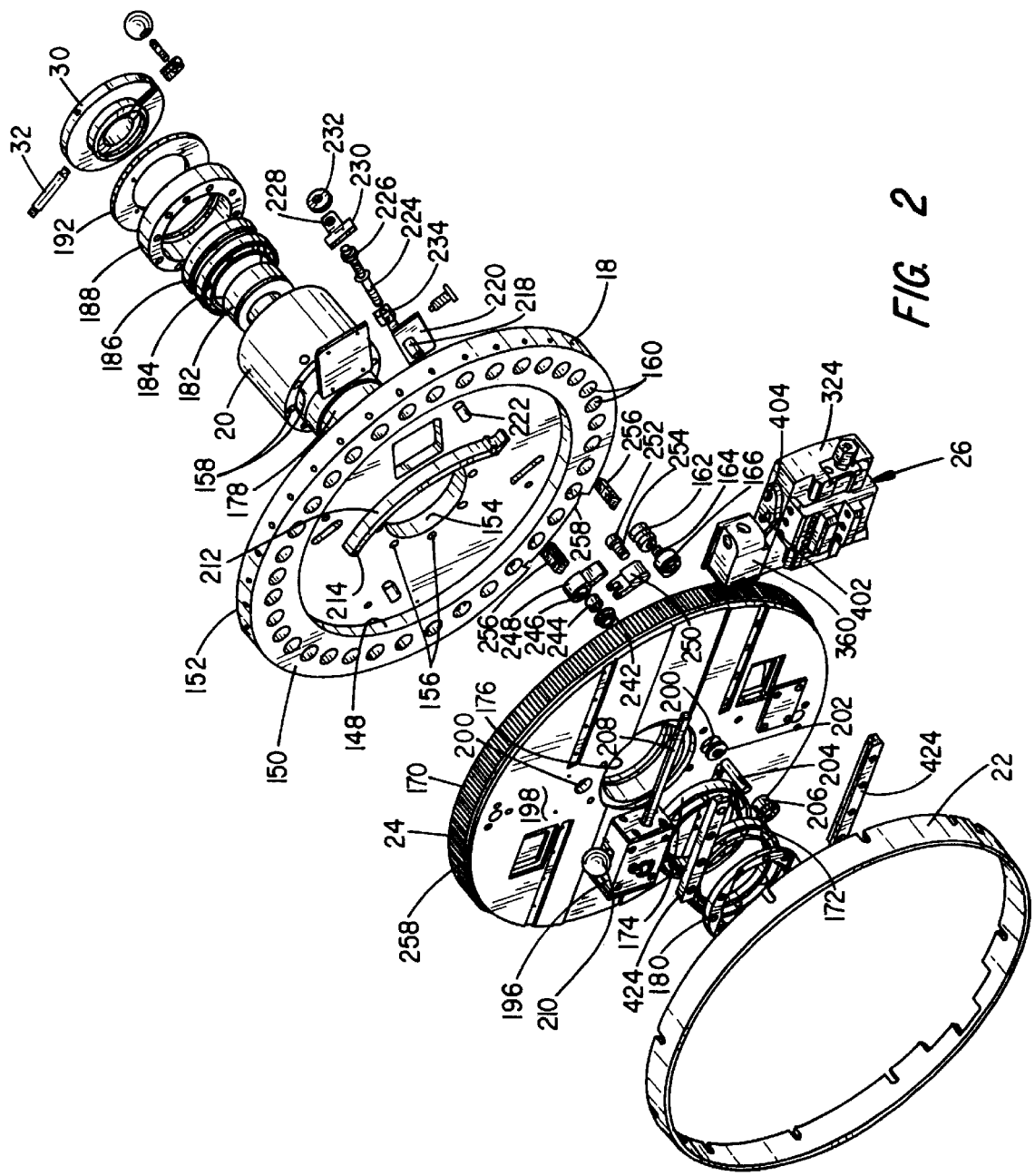
FIG. 2 is an exploded assembly drawing of the device of FIG. 1.
Figure 4:
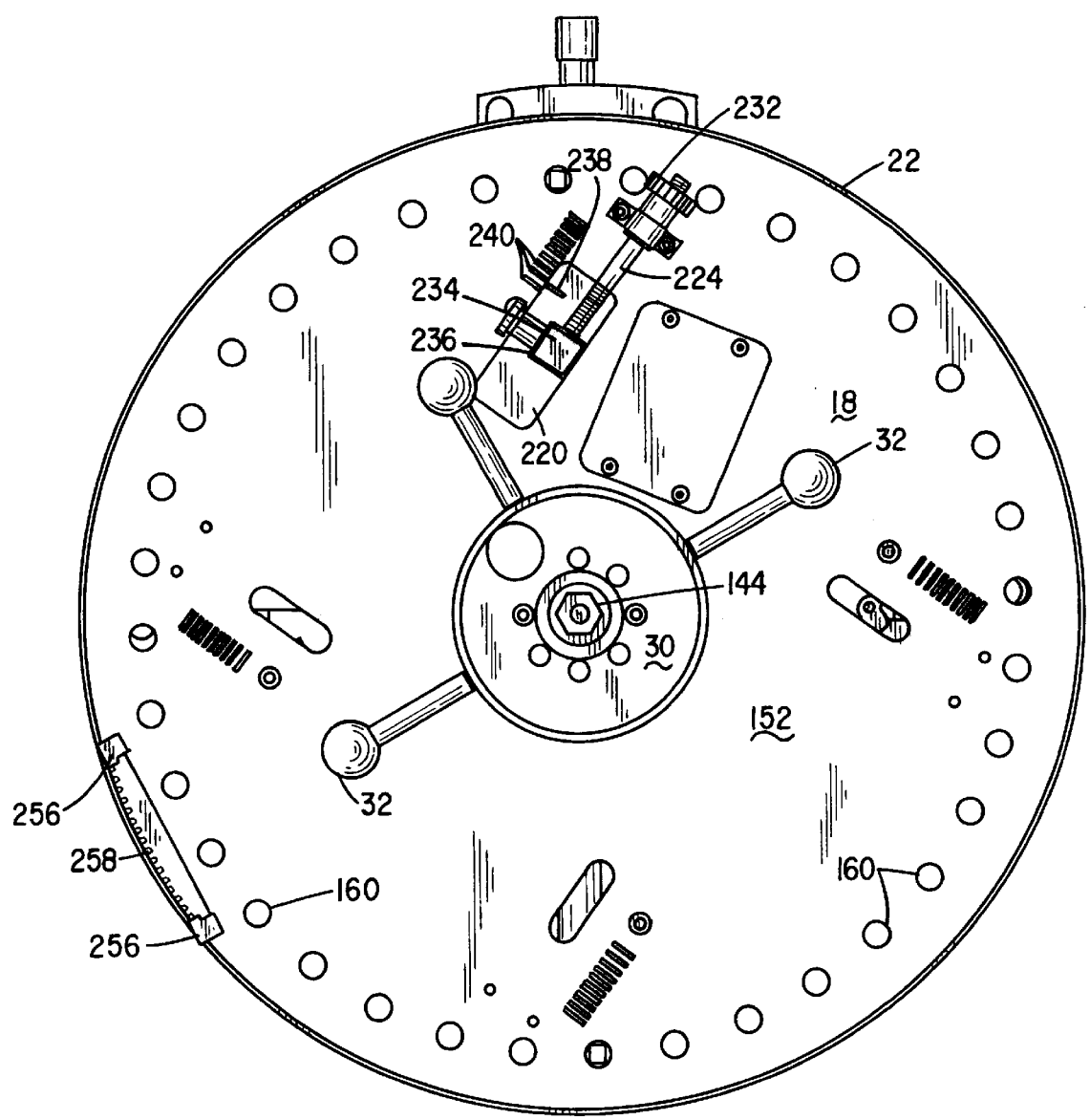
FIG. 4 is a right end view of the device of FIG. 1.

Having described in detail the mandrel assembly and its manner of mounting relative to a pipe to be machined, attention is next directed to the details of the end prep machine apparatus that mounts on the mandrel and, in this regard, reference is made to FIG. 2, the cross-sectional view of FIG. 3 and the end view of FIG. 4.

FIG. 2 shows the portion of the end prep machine that mounts on the previously described mandrel assembly. It comprises an annular housing member 18 adapted to be concentrically disposed on the mandrel. The member 18 comprises a plate having a cylindrical recess 148 formed inwardly of a first face 150 thereof and leading to an opposed face 152. The face 152 includes a central bore 154 formed through its thickness dimension and surrounding the bore 154 are regularly spaced bolt holes 156 to accommodate bolts (not shown) that pass therethrough and into threaded bores 158 formed in a front face of housing hub member 20.

Formed completely through the thickness dimension of the annular housing 18 are a plurality of regularly spaced apertures 160. FIG. 2 shows 36 such bores spaced at 10° intervals and each falls on a circular locus concentric with the bore 154. Each of the bores 160 receives an eccentric collar 162 therein and screwed into the collar 162 is the threaded shaft 164 of a bearing 166. The bearings 166 are adapted to fit into an annular groove 168 formed in the rear face 170 of the gear ring 24. Because bores 160 are drilled completely through the thickness of the housing 18, a tool can be inserted from the rear to adjust the engagement of the bearings 166 with the groove 168 by simply rotating the eccentric. Further journaling ring gear 24 are bearings 172 and 174 that are adapted to fit within the central opening 176 formed through the thickness dimension of the gear ring 24 so as to surround an annular collar portion 178 of the housing hub 20. See FIG. 3. A bearing cover 180 is fastened by bolts (not shown) to retain the bearings 172 and 174 in place.

To achieve axial feed along the mandrel, a threaded feed nut 182 is adapted to be threaded onto the threaded portion 138 of the mandrel feed screw 134 (FIG. 5) and surrounding the feed nut are bearings 184 and 186 that are contained within a toroidal bearing housing 188. The bearing housing 188 is bolted to the rear face of the housing hub 20 by bolts 190 as shown in FIG. 3. A detent plate 192 termed a "click plate" is fastened by screws to the rear face of the bearing housing 188 and a hand wheel 30 that slips over the mandrel feed screw 134 fastens by bolts as at 194 in FIG. 3 to the feed nut 182.

It will be seen, then, that when the hand wheel 30 is rotated with the aid of the handle members 32, the feed nut will be rotated within the housing hub and since the mandrel is stationary and the housing hub 20 is constrained by the longitudinal keys 126–132 against rotation, the annular housing 18 supporting the gear ring 24 will be displaced in the axial direction along the mandrel shaft 112 in a direction that depends on the direction of rotation of the hand wheel 30.

Referring again to FIG. 2, a pair of gear boxes as at 196 are bolted to the front face 198 of the gear ring 24 proximate a pair of bores 200 formed through the thickness dimension of the gear ring. One such gear box is provided for each tool slide assembly employed. Journaled in the bores 200 by gear bushings 202 are clutch shafts 204 to which is affixed a bevel gear 206. As will be explained in greater detail when the gear box assembly is described with the aid of FIG. 6, unidirectional rotation of the bevel gear 206 will cause a shaft 208 of hexagonal cross-section exiting the gear box 196 to rotate clockwise or counterclockwise or remain stationary, depending upon the manual positioning of a clutch shaft 210.

The hex shaft 208, in turn, drives a tool slide feed screw in tool slide assembly 26 or 28 to provide a tool feed rate in the radial direction that is manually adjustable in a manner next to be described.

Referring to FIG. 2, enclosed within the annular housing 18 are four arcuate ramp members, only one of which is shown and is identified by numeral 212. Each of the four arcuate ramp members spans approximately 90 radial degrees and each is pivotally mounted at one end 214 thereof to the inside of the face 152 of the annular housing 18. The opposite end 216 is pinned to an adjustment arm 218 that projects outwardly from a major surface of an index plate 220 with the arm 218 projecting through an elongated slot 222 formed through the face 152 of the annular housing 18. Referring to FIGS. 2 and 4, the adjustment arm 218 carrying one end of the ramp 212 can be shifted to vary the angle of inclination of the ramp 212. More particularly, a threaded shaft 224 passes through a bushing 226 and through an aperture 228 in an adjustment bracket 230 that is fastened by screws (not shown) to the face 152 of the housing. A thumb wheel or knob 232 attaches to the portion of the threaded rod 224 projecting beyond the bushing 226 to facilitate the rotation of the threaded rod. The other end of the threaded rod internal threads formed in the bore of an adjustment nut member 234 that fits into a recess 236 (FIG. 4) of the index plate 220. Thus, by rotating the knob 232, the adjustment arm 218 on the index plate 220 pivots the ramp 212 about pivot connection 214 to vary the slope or inclination of the ramp. An index mark 238 on the index plate 220 along with the scale markings 240 formed in the face 152 can be used to calibrate the feed rate of the tool slide 26. Specifically, moving the index marked 238 a distance between two adjacent scale markings, 240 results in a speed change of 0.002 inches/revolution.

Referring again to FIG. 2, fitted onto the end of the clutch shaft 204 opposite bevel gear 206 is a gear bushing 242 which, along with gear bushing 202, journals the shaft 204 in the bore 200 of the gear ring 24. Fitted over the exposed end of the clutch shaft 204 is a one-way ratchet-type roller clutch member 244 which, in turn, fits within a bore 246 of a cam 248. A cam lever arm 250 is pivotally hinged to cam 248 with tension springs (not shown) coupled between the cam 248 and the cam lever arm 250. A track roller 252 having a threaded stub 254 is screwed into a threaded bore in the cam lever arm 250 and is arranged to ride against the ramps 212. The springs (not shown) coupled between the cam lever arm 250 and the cam 248 keeps the two parts engaged and rotates the shaft 204 through the one-way ratchet clutch member 244. The extent to which the shaft is rotated as the cam roller 252 traverses the ramps 212 is dependent upon the slope of the ramp which, as already indicated, is manually adjustable, via the knob 232.

The motor for driving the gear ring 24 is not shown in the drawings, but it is adapted to be fastened to the annular housing 18 by motor mount lock members 256 in a recess 258 so that a pinion gear on the motor's shaft engages the teeth 258 of the gear ring 24 beneath the shield 22.

Figure 6:
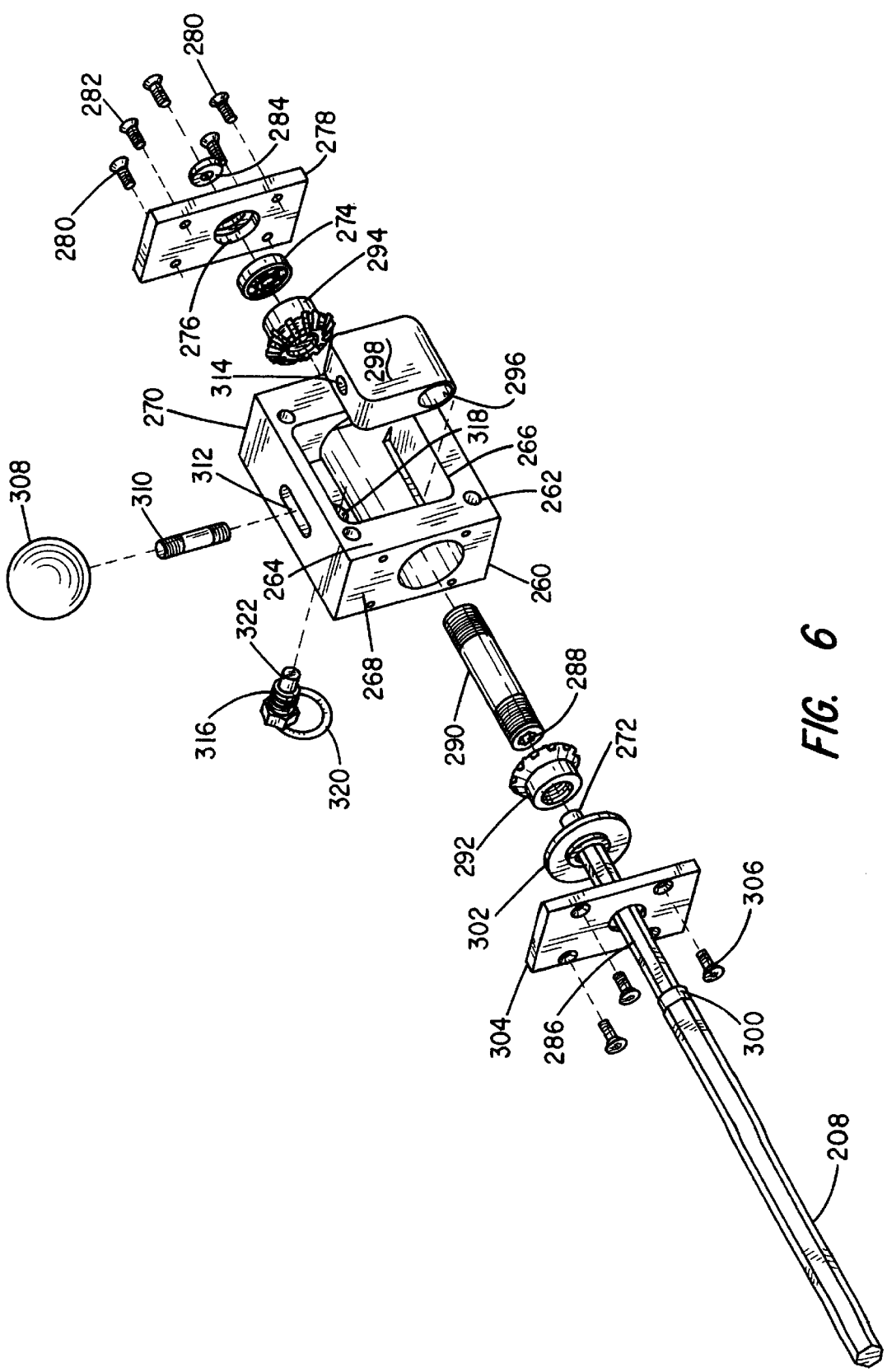
FIG. 6 is an exploded view of the gear box subassembly used in implementing the machine of FIG. 1.

FIG. 6 is an exploded view illustrating the constructional features of the gear box 196 used to couple the input clutch shaft 204 to the feed screw of the tool slide assembly 26. The gear box assembly includes a gear box housing 260 which comprises a generally rectangular block that is adapted to be bolted directly to surface 198 of the gear ring 24 by bolts (not shown) passing through the apertures 262 proximate the four corners thereof. The rear face 264 has a rectangular opening 266 formed therein leading to a hollow interior. Opposed edge faces 268 and 270 each have a circular bore for allowing the hex shaft 208 to be passed therethrough. The rightmost end 272 of the hex shaft 208 is journaled for rotation in a bearing 274 that fits within a bore 276 formed in a front cover member 278. The front cover member bolts to the face 270 of the gear box housing 260 by screws 280 and a further screw 282 is used to attached a thrust washer 284 to the end 272 of the hex shaft 208.

The hex shaft 208 is stepped down to a reduced diameter section 286 and is dimensioned to slidingly fit within a bore 288, also of hex cross-section, formed longitudinally through a slide shaft 290. The slide shaft 290 is threaded at each end, allowing miter gears 292 and 294 to be screwed thereon. The unthreaded central portion of the slide shaft 290 fits into a bore 296 formed through a shifter slide member 298 which fits through the rectangular opening 266 in the gear box housing 260. Thus, the miter gears 292 and 294 are maintained in spaced-apart relationship, but can be moved back and forth in unison along the reduced diameter portion 286 of the hex shaft 208.

The hex shaft 208 includes a cylindrical portion 300 that fits within shaft bushing member 302 when the rear cover 304 is fastened to the face 268 of the housing 260 by screws 306. A manually-operable shifting lever, including a knob 308 and a shaft 310, fastens to the shifter slide member 298 upon passing through an elongated slot 312 in the gear box housing 260 and into a threaded bore 314 in the shifter slide. A spring-loaded plunger 316 threads into a bore 318 on the outer face of the gear box and is arranged to snap into one of three spaced-apart bores (not shown) formed in a face of the shifter slide 298. By pulling back on the ring 320, the pin 322 can be extracted from its disposition in one of the bores in the shifter slide 298, allowing the shifter slide to longitudinally displace the miter gears 292 and 294 relative to the miter gear 206 on the clutch shaft 204. If the miter gear 206 is neither engaged with miter gear 292 or 294, the gear box is in neutral, such that the hex shaft 208 is not driven. By sliding the shifter knob 208 in a first direction, the input miter gear 206 will engage the miter gear 292 to effect clockwise rotation of the hex shaft 208 and if shifted in the other direction, the input gear 206 will mesh with the miter gear 294 to cause the hex shaft to rotate in a counterclockwise direction. In each instance, the spring plunger 322 is used to lock the shifter 298 at a selected location.

Figure 7:
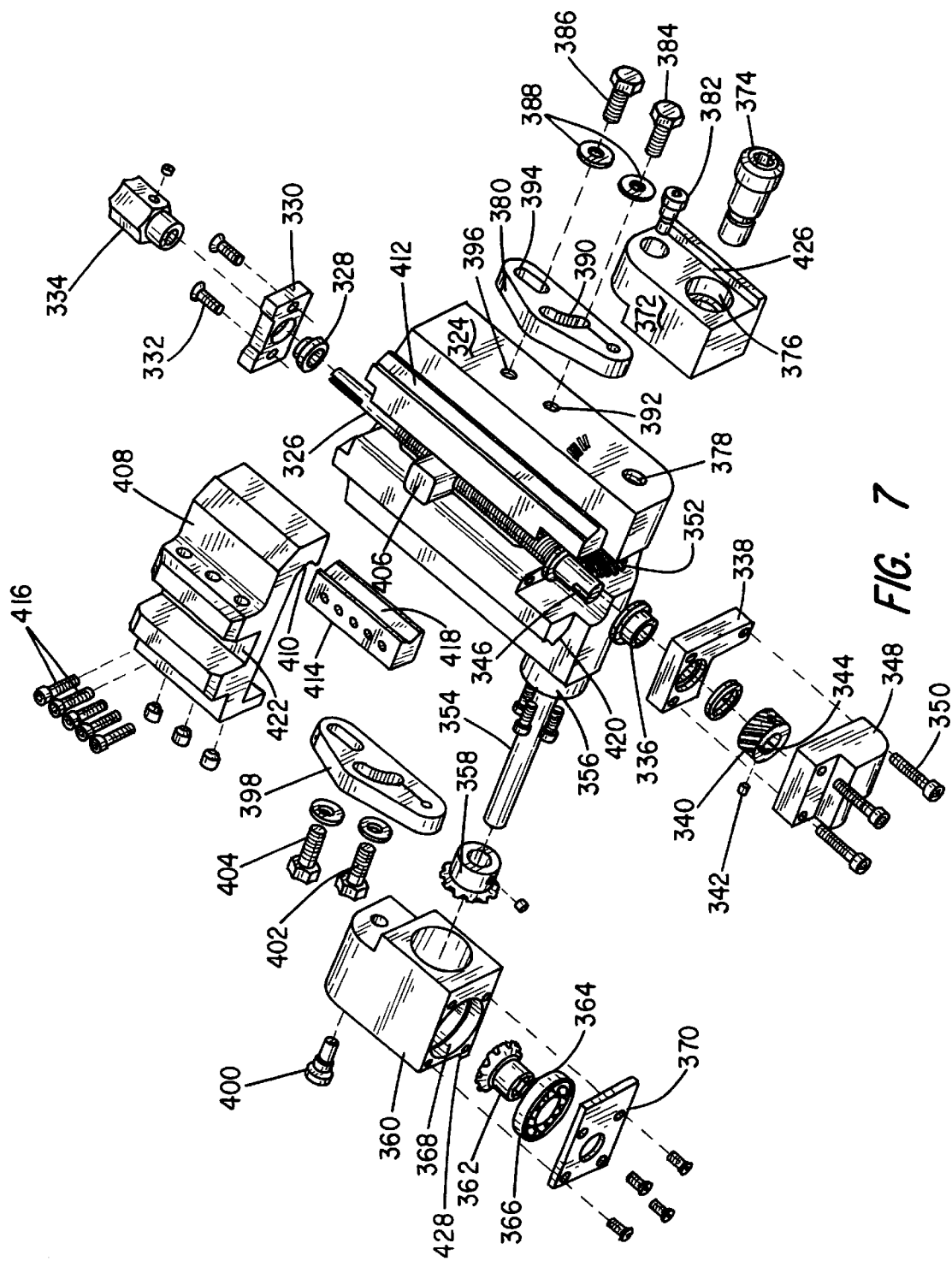
FIG. 7 is an exploded perspective view of the slide assembly used on the machine of FIG. 1.

Referring lastly to FIG. 7, an explanation will now be given of the constructional features of the slide assemblies 26/28. The two tool slide assemblies are identical and each includes a base 324 having a threaded feed screw 326 journaled for rotation therein. In this regard, a bushing 328 fits about a non-threaded end portion of the feed screw 326 and is held in place by a bearing bracket 330 that fastens to the base by screws, as at 332. Keyed to an outwardly extending portion of the feed screw 326 is a hex nut 334, permitting manual rotation of the shaft 326 with the aid of a wrench or the like.

The opposite end of shaft 326 is also unthreaded and passes through a bushing 336 supported in a bracket 338 that also bolts to the base 324. A helical gear 340 is secured to the end of the feed screw 326 by a set screw 342 and a key (not shown) adapted to fit into the keyway 344 in the helical gear and key way 346 in the end of the shaft 326. A gear cover 348 bolts to the base 324 by bolts 350.

The helical gear 340 is adapted to mesh with a corresponding helical gear 352 affixed to a drive shaft 354 that is journaled in a pivot bushing 356 affixed to the base 324. A miter gear 358 is keyed to the shaft 354. Miter gear 358 is housed within a bracket 360 so as to mesh with a miter gear 362 that has a hexagonal central bore 364 formed therein for receiving the end portion of the hex shaft 208 from the gear box assembly of FIG. 6. A bearing 366 fits about a stem portion of the miter gear 362 and fits within a bore 368 of the bracket member 360. A bracket cover plate 370 retains the bearing in place.

Secured to the opposite side of the base 324 from the bracket 360 is a further mounting bracket 372. It is pivotally secured to the base 324 by means of a shoulder screw 374 that passes through a bore 376 in the bracket and into a threaded bore 378 formed in the base. An adjustable arm bracket 380 is pivotally attached to the bracket 372 by a further shoulder bolt 382. A pair of clamping bolts 384 and 386 pass through washers 388, with clamping screw 384 passing through an arcuate slot 390 formed through the bracket arm 380 and entering a threaded bore 392 from the base 324. The screw 386 passes through an elongated slot 394 in the bracket arm 380 and into a threaded bore 396 in the base. In a similar fashion, a further bracket arm 398 fastens to the opposed side edge of the base 324 by means of a shoulder bolt 400 and clamping screws 402 and 404.

A feed nut 406 is disposed on the feed screw 326 and is adapted to cooperate with a mating recess (not shown) formed on the undersurface of tool slide member 408. The tool slide member 408 includes a longitudinal V-notch 410 for engaging a corresponding V-shaped guide rail 412 on the base 324. Likewise, a gib 414 bolts to the slide 408 by means of socket head cap screws 416. The gib 414 includes a V-shaped guideway 418 that cooperates with a V-shaped guide 420 on the base. Thus, as the feed screw 326 is rotated, the tool slide 408 will be displaced longitudinally along the base in a direction depending upon the direction of rotation of the feed screw. A cutting tool (not shown) is adapted to be clamped in the rectangular recess 422 formed centrally in the tool slide 408.

Two tool slide assemblies, like that shown in FIG. 7, may be adjustably fastened to the face 198 of the rotatable gear ring 24 by lock down bars, as at 424 (FIG. 2) that cooperate with the flange 426 on support bracket 372 and flange 428 on support bracket 360. With the brackets clamped in place in the manner indicated, it is possible to orient the base 324 of the tool slide assembly at a desired acute angle and radial distance from the centerline out to the plane of the face 198 of gear ring 24. That is to say, by loosening the screws 384-386 and 402-404, the tool slide assemblies can be tipped or tilted in the fashion shown in FIG. 1 where tool slide assembly 28 is non-parallel to the face of the gear ring 24. This is advantageous when it is desired to bevel or miter the end of the workpiece.

OPERATION

In operation, a workman will first install the mandrel 16, centering it with the longitudinal axis of the tubular workpiece, using the adjustable locators 42–48 on the base 14 and taking advantage of the properties of the spherical bearing 62 and the adjustment features afforded by the mounting plates 72 and 90, as previously described. When the desired concentric positioning of the mandrel is achieved, the draw rod nut 144 may be tightened to lock the spherical bearing and preventing any swiveling thereof.

Next, the assembly of FIG. 2 is fitted onto the mandrel with the handwheel 30 being advanced onto the mandrel feed screw 134 to control the positioning of the housing 18 and the gear ring 24.

Next, the tool slide assemblies may be clamped to the face of the gear ring 24 at a desired radial distance from the centerline of the workpiece and a suitable drive motor is secured to the stationary housing 18 with its output gear engaging the peripheral gear on the gear ring 24. Now, depending upon the machining operation to be performed on the workpiece, the angular adjustment of the tool slide assemblies 26 and 28 can be set.

The axial feed speed can be adjusted by rotating the knobs 232 controlling the angle of slope of the ramps 212. Once the desired radial tool slide speed is attained, the axial feed handwheel 30 is rotated until the cutting tool abuts the workpiece. Now, by pulling outward on the plunger ring 320 while shifting the knob 308 of the gear box in a forward direction, the hex rod 208 will be rotated in a direction to drive the tool slide feed screws, causing the tool slide member 408 to move radially inward toward the center of the workpiece. Once the assembly and set-up is complete, the motor may be turned on to rotate the ring gear 24 relative to the stationary housing 18. Upon making a first radial cut of a predetermined depth, the hand wheel 30 may again be rotated, using the click plate and associated detent as an indicator of the amount of axial movement of the cutting tool. The shifter may then be moved in a direction to cause the tool slide 408 to move radially outward and this process can be repeated a number of times until a desired amount of material has been removed from the workpiece.

Thus it can be seen that the present invention provides a number of significant advantages over prior art machines designed for the same purpose. Only a single drive motor is required, yet means coupled to the driven ring gear are provided for accurately adjusting the speed of travel of a cutting tool in a radial direction. Moreover, the present invention allows both single point and form tool cutting. The ability to tilt the tool slide assembly facilitates beveling at an angle between 0° and about 37°. Further, the tool slides can be radially positioned on the face of the gear ring to permit use with pipes of varying sizes. The cam actuated variable feed rate feature allows precise control of as little as 0.002 and up to 0.040 in. per revolution.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. Portable apparatus for machining pipes, valves, flanges and fittings, comprising in combination:
    (a) an elongated mandrel having radially adjustable legs proximate one end thereof and adapted to concentrically mount the mandrel to an inside diameter of a tubular workpiece to be machined;
    (b) an annular housing member concentrically disposed on said mandrel and longitudinally displaceable along the mandrel, said housing member containing a plurality of regularly spaced bearings projecting outwardly from one face proximate an outer periphery thereof;
    (c) a gear ring concentrically disposed on and journaled for rotation about the mandrel, the gear ring having first and second faces, the first face including an annular groove for receiving said plurality of regularly spaced bearings therein;
    (d) a first tool slide assembly having a base with a threaded feed screw journaled for rotation therein, the feed screw carrying a threaded feed nut and a tool block slidably mounted on the base and engaged by the feed nut such that rotation of the feed screw displaces the tool block relative to the base, the first tool slide assembly being adjustably mounted to the second face of the gear ring whereby the base is positionable at a desired acute angle to the second face;
    (e) motor means affixed to the annular housing member for driving the gear ring; and
    (f) drive means operatively coupled between the gear ring and the feed screw for rotating the feed screw as the gear ring is rotated.

2. The portable apparatus as in claim 1 wherein the mandrel comprises:
    a tubular shaft of generally circular cross section having longitudinal keyways formed in an outer surface and a central bore of a predetermined diameter formed therethrough, with a counter bore at opposed ends thereof, the counter bore in a first of said opposed ends receiving a first end of a tubular cylindrical mandrel feed screw therein, the tubular, cylindrical feed screw being externally threaded over a predetermined peripheral surface thereof.

3. The portable apparatus as in claim 2 wherein the counterbore in a second of the opposed ends is internally threaded.

4. The portable apparatus as in claim 3 and further including a first rectangular mounting plate having first and second rectangular notches formed inwardly in opposed edge surfaces thereof, the first mounting plate including a tubular stub projecting orthogonally from one major surface thereof, the tubular stub being externally threaded for mating with the internal threads of the counterbore in the second of the opposed ends of the tubular shaft of generally circular cross-section; a second rectangular mounting plate having orthogonally projecting lugs dimensioned to fit within the first and second notches of the first mounting plate; a mandrel housing for containing the first and second mounting plates therein; and a radial bushing disposed in the mandrel housing for swivel mounting the radially adjustable legs to the mandrel.

5. The portable apparatus as in claim 4 and further including means for vertically and horizontally setting a longitudinal axis of the mandrel to the concentric with said tubular workpiece.

6. The portable apparatus as in claim 5 and further including a draw rod extending through the bore of the tubular shaft cooperating with a second end of the mandrel feed screw and with the mandrel housing for holding the setting of the longitudinal axis of the mandrel relative to that of the tubular workpiece.

7. The portable apparatus of claim 2 and further including a hand wheel having an internally threaded central bore for mating with the external threads of the mandrel feed screw for longitudinally displacing the annular housing member, the gear ring and tool slide assembly.

8. The portable apparatus of claim 7 and further including means cooperating with the hand wheel for indicating discrete units of displacement of the tool slide assembly.

9. The portable apparatus of claim 2 and further including key members inserted in the keyways and cooperating with the annular housing member for preventing rotation of the annular housing member while permitting translation thereof along the tubular shaft of generally circular cross-section.

10. The portable apparatus of claim 1 wherein the annular housing member includes a plurality of bores formed in the face thereof and being regularly spaced on a circular locus, each of said bores including an eccentric member with said plurality- of bearings mounted in the eccentric members.

11. The portable apparatus of claim 10 wherein the plurality of bores include a tool receiving opening adapted to permit entry of a tool for rotating the eccentric to thereby align the bearings in the annular groove in the first face of the gear ring.

12. The portable apparatus of claim 1 wherein the tool slide assembly includes a first helical gear affixed to one end of the feed screw that meshes with a second helical gear affixed to a drive shaft journaled for rotation in the base along an axis perpendicular to the feed screw, the drive shaft being coupled to the drive means.

13. The portable apparatus of claim 1 wherein the tool slide assembly further includes first and second mounting brackets pivotally affixed to opposed side surfaces of the base, the first and second mounting brackets being secured to the second face of the gear ring and first and second support brackets pivotally joined at one end to the first and second mounting brackets, respectively, and clamping bolts extending through slots formed through the first and second support brackets and into the opposed side surfaces of the base.

14. The portable apparatus of claim 1 wherein the speed at which the drive means rotates the feed screw is manually adjustable.

15. The portable apparatus of claim 1 wherein the drive means includes means for shifting the direction of rotation of the feed screw.

16. The portable apparatus of claim 15 wherein the means for shifting includes a neutral position where the feed screw is not driven.

17. The portable apparatus of claim 1 and further including a second tool slide assembly substantially identical to the first tool slide assembly and adjustably mounted to the second face of the gear ring whereby the base of the second tool slide assembly is positionable at a desired angle to the second face.

18. The portable apparatus of claim 17 and further including a further drive means operatively coupled between the gear ring and the feed screw of the second tool slide assembly as the gear ring is rotated.

19. The portable apparatus of claim 1 wherein the drive means includes a gear box; an elongated shaft of a non-circular cross-section journaled for rotation in the gear box; a tubular slide member concentrically disposed on the elongated shaft of non-circular cross-section and slidably positionable therealong, the tubular slide member having first and second bevel gears affixed thereto at opposed ends thereof; an input shaft having a third bevel gear thereon and adapted to mesh with one, the other or neither of the first and second bevel gears depending on the position of the slide member on the elongated shaft of non-circular cross-section; and a shift lever extending outward from the gear box and coupled to the slide member for use in manually shifting the position of the slide member.

20. The portable apparatus of claim 19 wherein the shaft of non-circular cross-section is coupled to the feed screw of the tool slide.

21. The portable apparatus of claim 20 and further including means for adjusting the speed of rotation of the input shaft of the drive means.

22. The portable apparatus of claim 21 wherein the means for adjusting comprises:

(a) a plurality of ramps pivotally affixed to the one face of the annular housing member;

(b) means for manually setting the slope angle of the plurality of ramps;

(c) a one-way ratchet clutch affixed to the input shaft of the drive means, the input shaft being journaled for rotation in the gear ring; and (d) a cam for traversing the plurality of ramps as the gear ring is driven, the cam rotating the one-way ratchet clutch by an amount determined by the slope angle of the ramps.

* * * * *